United States Patent [19]

Fujimura

[11] Patent Number: 5,162,692
[45] Date of Patent: Nov. 10, 1992

[54] ULTRASONIC OSCILLATOR AND ULTRASONIC MOTOR USING THE SAME

[75] Inventor: Takanao Fujimura, Tokyo, Japan

[73] Assignee: Olympus Optical Company Limited, Japan

[21] Appl. No.: 636,553

[22] Filed: Jan. 4, 1991

Related U.S. Application Data

[63] Continuation of Ser. No. 370,288, Jun. 22, 1989, abandoned.

[30] Foreign Application Priority Data

| Oct. 26, 1986 | [JP] | Japan | 63-270292 |
| Jun. 29, 1988 | [JP] | Japan | 63-161786 |
| Aug. 15, 1988 | [JP] | Japan | 63-203031 |
| Oct. 26, 1988 | [JP] | Japan | 63-270291 |

[51] Int. Cl.$^5$ .............................. H01L 41/08
[52] U.S. Cl. ........................ 310/323; 310/325; 310/328
[58] Field of Search .................... 310/323, 325, 328

[56] References Cited

U.S. PATENT DOCUMENTS

| 4,249,100 | 2/1981 | Vasiliev et al. | 310/328 X |
| 4,400,641 | 8/1983 | Vishnevsky et al. | 310/328 X |
| 4,453,103 | 6/1984 | Vishnevsky et al. | 310/328 X |
| 4,634,916 | 1/1987 | Okada et al. | 310/328 X |
| 4,663,556 | 5/1987 | Kumada | 310/323 X |
| 4,697,117 | 9/1987 | Mishiro | 310/328 X |
| 4,893,046 | 1/1990 | Honda | 310/323 |
| 4,933,590 | 6/1990 | Inoue et al. | 310/323 |

FOREIGN PATENT DOCUMENTS

| 0231940 | 8/1987 | European Pat. Off. | 310/325 |
| 3433768 | 4/1985 | Fed. Rep. of Germany | 310/323 |
| 0062880 | 4/1985 | Japan | 310/323 |
| 0148387 | 8/1985 | Japan | 310/323 |
| 0196773 | 8/1986 | Japan | 310/323 |
| 0092778 | 4/1987 | Japan | 310/323 |
| 0011073 | 1/1988 | Japan | 310/323 |
| 0167682 | 7/1988 | Japan | 310/323 |
| 0224678 | 9/1988 | Japan | 310/323 |
| 197710 | 10/1977 | U.S.S.R. | 310/323 |
| 0623241 | 9/1978 | U.S.S.R. | 310/325 |
| 0635538 | 11/1978 | U.S.S.R. | 310/328 |
| 0773715 | 10/1980 | U.S.S.R. | 310/323 |
| 0794685 | 1/1981 | U.S.S.R. | 310/323 |
| 0817815 | 4/1981 | U.S.S.R. | 310/323 |
| 0858153 | 8/1981 | U.S.S.R. | 310/323 |
| 1023458 | 6/1983 | U.S.S.R. | 310/323 |

*Primary Examiner*—Mark O. Budd
*Attorney, Agent, or Firm*—Bruce L. Adams; Van C. Wilks

[57] ABSTRACT

Disclosed is an ultrasonic oscillator comprising piezoelectric elements and a resonator fixed thereto and having one or more inclined surfaces, elliptical oscillations being generated at the front end of the resonator. Also disclosed is an ultrasonic motor utilizing this oscillator and adapted to rotate a rotatably supported rotor by pressing it with an appropriate pressurizing force against the section where the elliptical oscillations are generated.

28 Claims, 9 Drawing Sheets

FIG. 1 (a)
FIG. 1 (b)
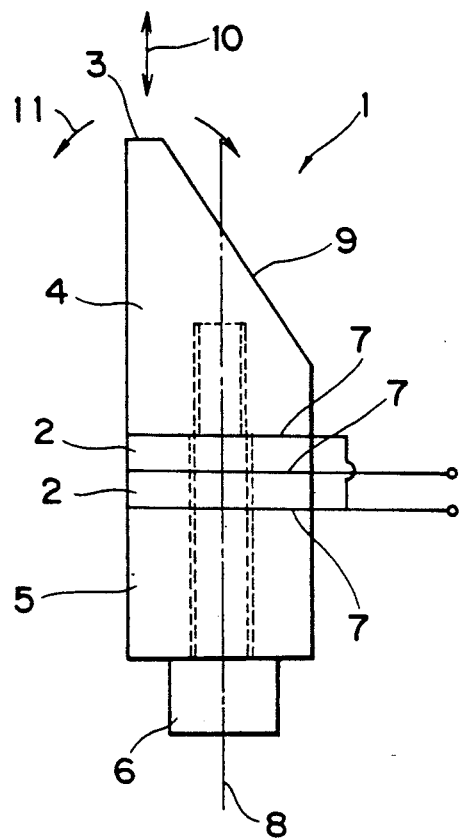
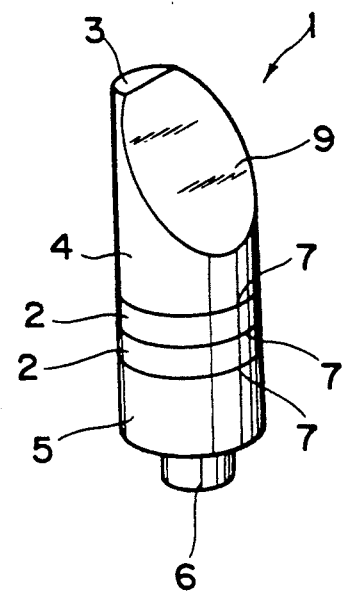
FIG. 2
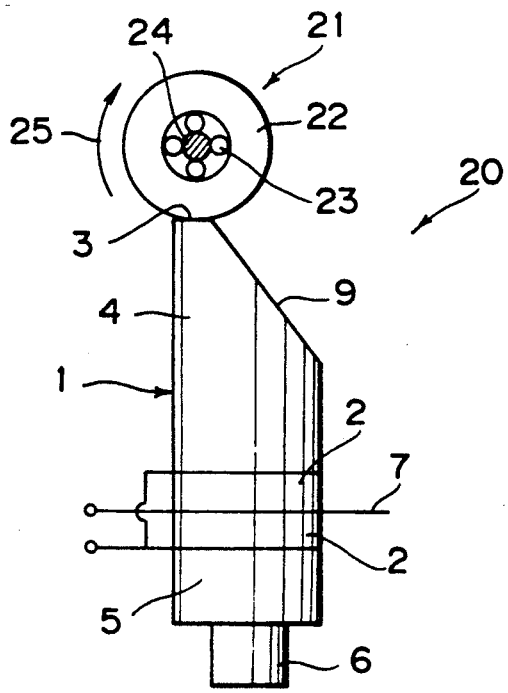

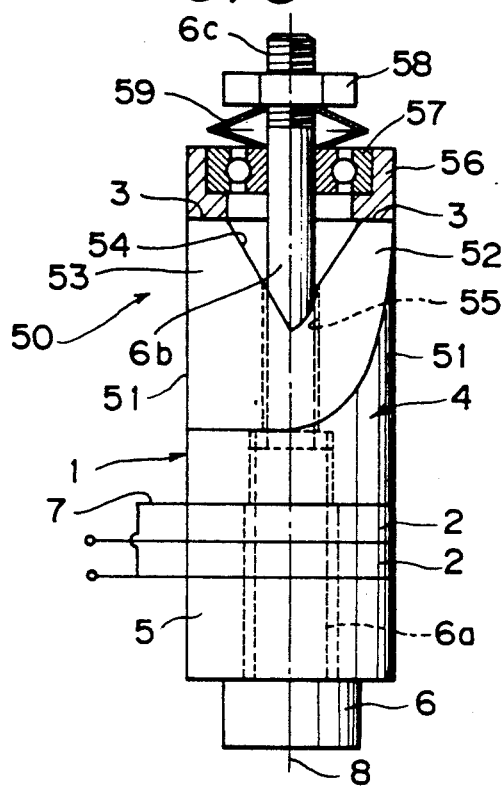
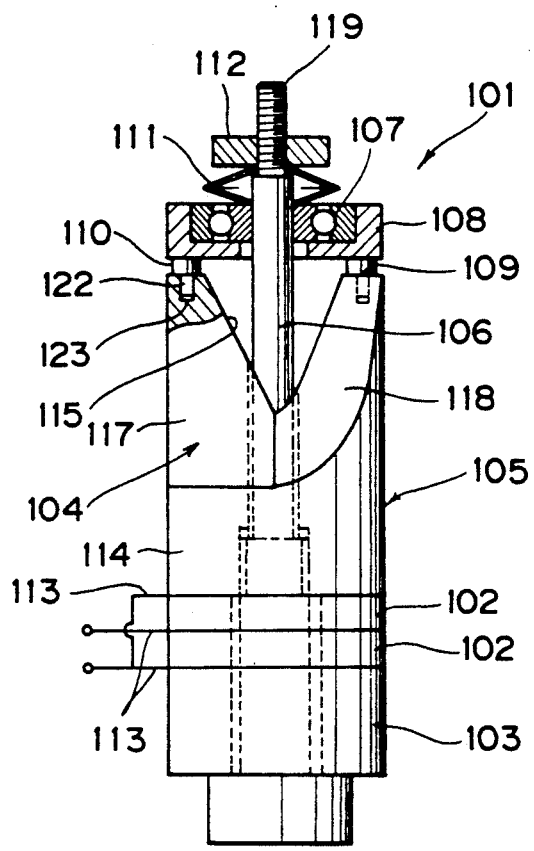
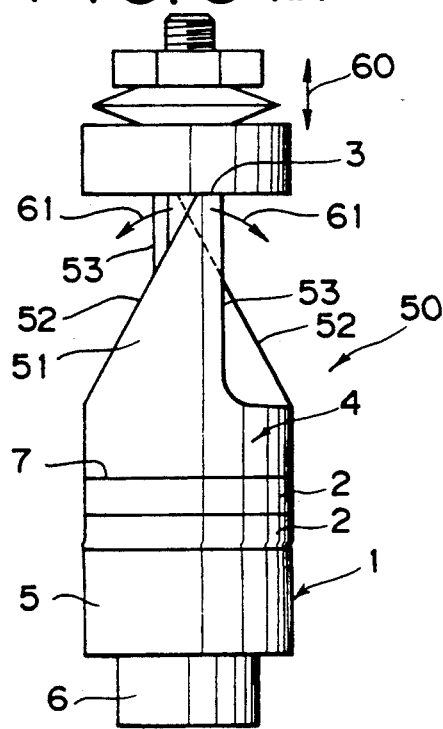
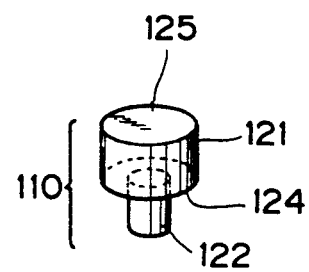

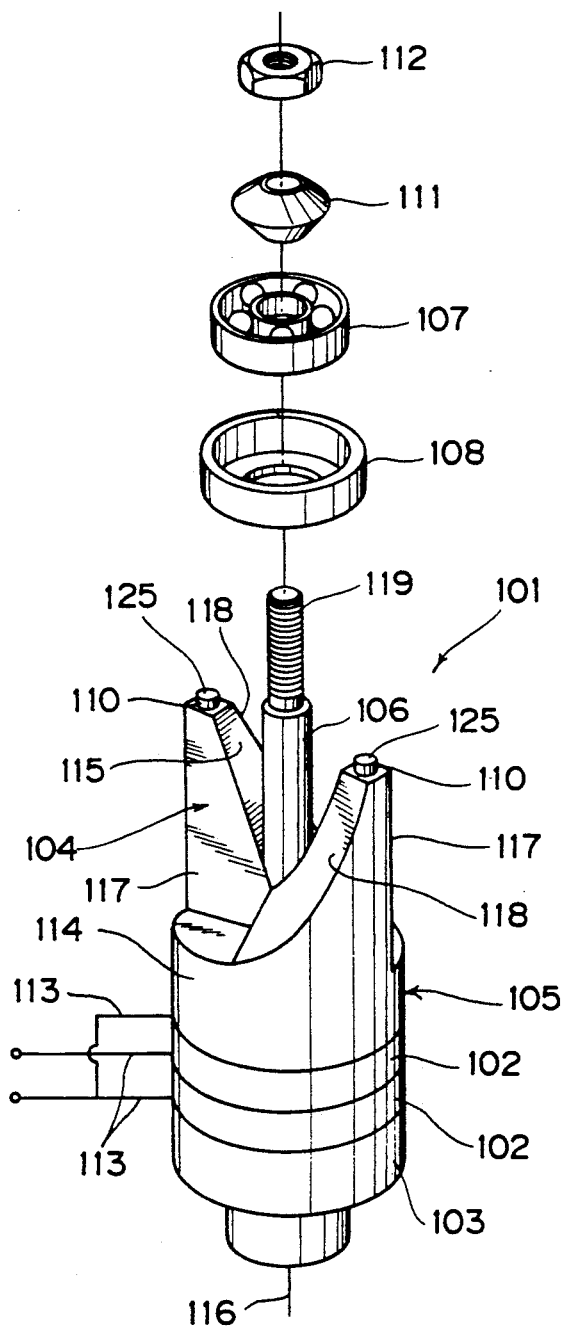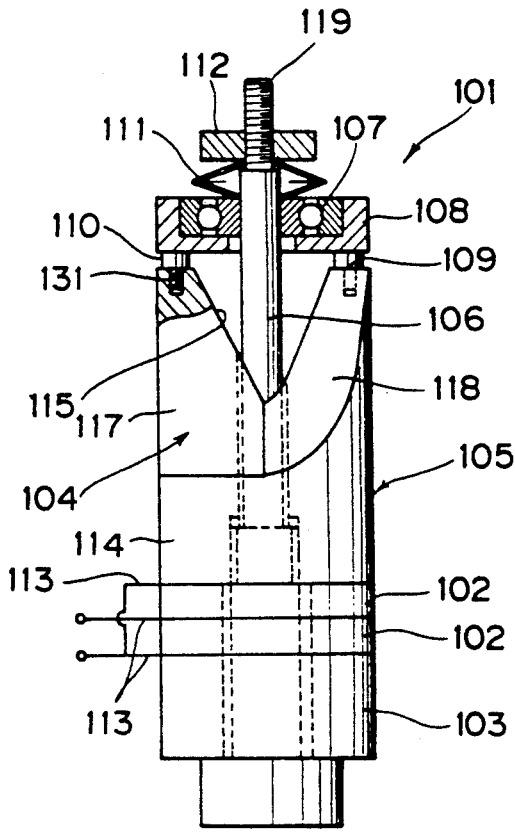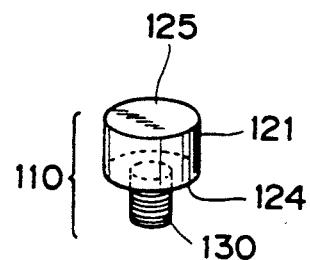

FIG. 10
FIG. 11 (a)
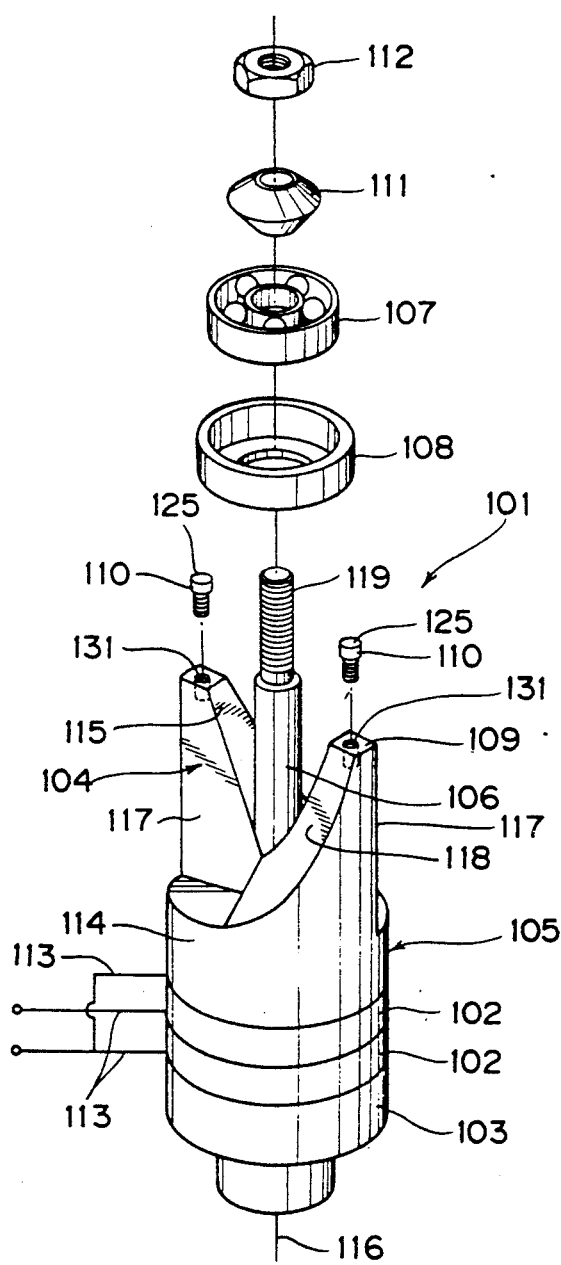
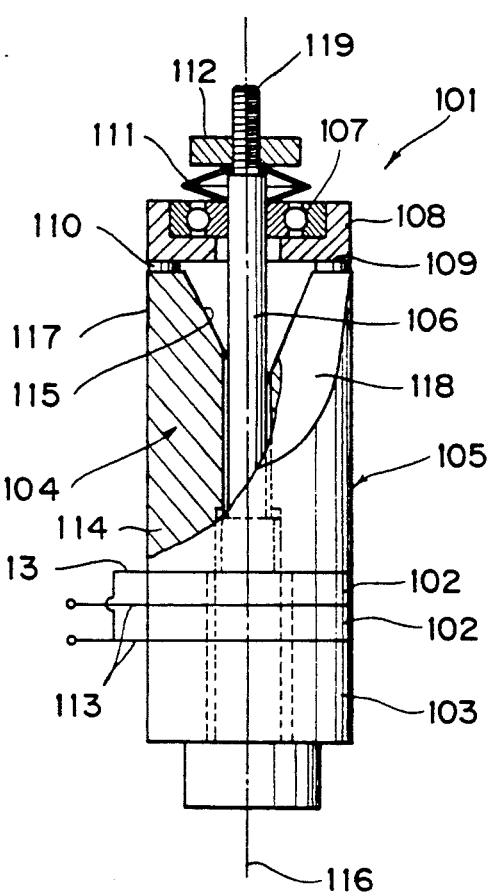

ULTRASONIC OSCILLATOR AND ULTRASONIC MOTOR USING THE SAME

This is a Rule 62 continuation application of parent application Ser. No. 370,288 filed Jun. 22, 1989 now abandoned.

BACKGROUND OF THE INVENTION

1. Field of the Invention

This invention relates to an ultrasonic oscillator and to an ultrasonic motor which drives a rotor or the like using the ultrasonic oscillator.

2. Description of the Related Art

Examples of ultrasonic motors of this type are disclosed in Japanese Patent Laid-Opens No. 61-52163 and 63-87184.

According to the disclosure of Japanese Patent Laid-Open No. 61-52163, an ultrasonic oscillator performs a beat/reflex oscillation which is a combination of beat mode and reflex mode oscillations, the latter exhibiting inverted phases on both sides of the longitudinal axis of a cantilever. A rotor is pressed against the end surface of the ultrasonic oscillator so as to be rotated with the surface.

According to the disclosure of Japanese Patent Laid-Open No. 63-87184, on the other hand, piezoelectric oscillators are provided on one end surface of a resonator to form an ultrasonic oscillator, oscillations in the thickness direction of the piezoelectric oscillators causing the ultrasonic oscillator to resonate in the longitudinal direction with half or an integral multiple of the wavelength thereof. Provided on the other end surface of the ultrasonic oscillator is one or a plurality of flexural-oscillation protrusions adapted to generate a flexural oscillation exhibiting a unilateral amplitude in response to the resonance of the ultrasonic oscillator, the flexural-oscillation protrusions being arranged around the axis of rotation of a rotor in such a manner that their free-end sections are in contact with the rotor.

The above-described conventional ultrasonic motors have, however, the following problems: in these conventional ultrasonic motors, the section where longitudinal oscillations are amplified and the section where lateral oscillations are generated are provided separately in terms of function, resulting in a complicated structure. Furthermore, since the mechanism for generating longitudinal oscillations and that for generating lateral oscillations are combined with each other in a separated form, a step section inevitably exists between them, which step section involves oscillatory energy loss, a serious structural defect in an ultrasonic motor. In the case of an ultrasonic motor using oscillation protrusions (Japanese Patent Laid-Open No. 63-87184), the following problem is, in particular, involved, in addition to the above-mentioned: that is, the oscillation protrusions are individually arranged on the resonator, so that, if a load is applied to one of the oscillation protrusions alone, only that protrusion to which the load is applied serves to rotate the rotor, the other protrusion oscillating in what is for practical purposes an unloaded state. Consequently, the oscillatory energy of this unloaded protrusion is hard to transmit to the loaded one.

SUMMARY OF THE INVENTION

This invention has been contrived in view of the above-mentioned problems experienced in the prior art. It is accordingly an object of this invention to provide an ultrasonic oscillator which has a simple structure and which operates efficiently, as well as an ultrasonic motor using this ultrasonic oscillator.

Another object of this invention is to provide an ultrasonic motor in which friction torque transmission pins having a high level of hardness and abrasion resistance protrude from ultrasonic-elliptical oscillation generating surfaces, thereby stabilizing the rotational conditions on the torque transmission surfaces, and in which the contact area between the transmission pins and the rotor is reduced, thereby attaining stability in rotation, preventing generation of noises, and lengthening the service life of the ultrasonic motor.

It is a further object of this invention to provide an ultrasonic motor in which a rotor and a connector are constantly kept together by a desired level of pressurizing force, thereby preventing any looseness in connection between the rotor and connector, as well as any looseness anywhere in the ultrasonic motor.

It is still another object of this invention to provide an ultrasonic motor in which oscillations of the cantilever section of a connector suffer no attenuation, and which, consequently, involves little oscillation loss, being free from output losses.

BRIEF DESCRIPTION OF THE DRAWINGS

FIGS. 1a and 1b are a front view and a perspective view, respectively, of a first embodiment of this invention;

FIGS. 2, 3, 4 (a,b) and 5 (a,b) show a second, a third, a fourth and a fifth embodiment of this invention, respectively;

FIG. 6 is a front view, partly in section, of a sixth embodiment of the ultrasonic motor of this invention;

FIG. 7 is a perspective view of an essential part of FIG. 6;

FIG. 8 is an exploded perspective view of an essential part of FIG. 6;

FIG. 9a is a front view, partly in section, of a seventh embodiment of the ultrasonic motor of this invention;

FIG. 9b is a perspective view of an essential part of FIG. 9a;

FIG. 10 is an exploded perspective view of an essential part of FIG. 9a;

FIG. 11a is a front view, partly in section, of an eighth embodiment of the ultrasonic motor of this invention;

FIGS. 11b and 11c are perspective views of an essential part of FIG. 11a;

FIGS. 11d, 11e and 11f are perspective veiws showing other examples of the construction of the essential part of FIG. 11a;

FIG. 12a is a partially cutaway front view of a ninth embodiment of the ultrasonic motor of this invention;

FIG. 12b is an exploded perspective view of the ultrasonic motor shown in FIG. 12a;

DESCRIPTION OF THE PREFERRED EMBODIMENTS

Figure 3:
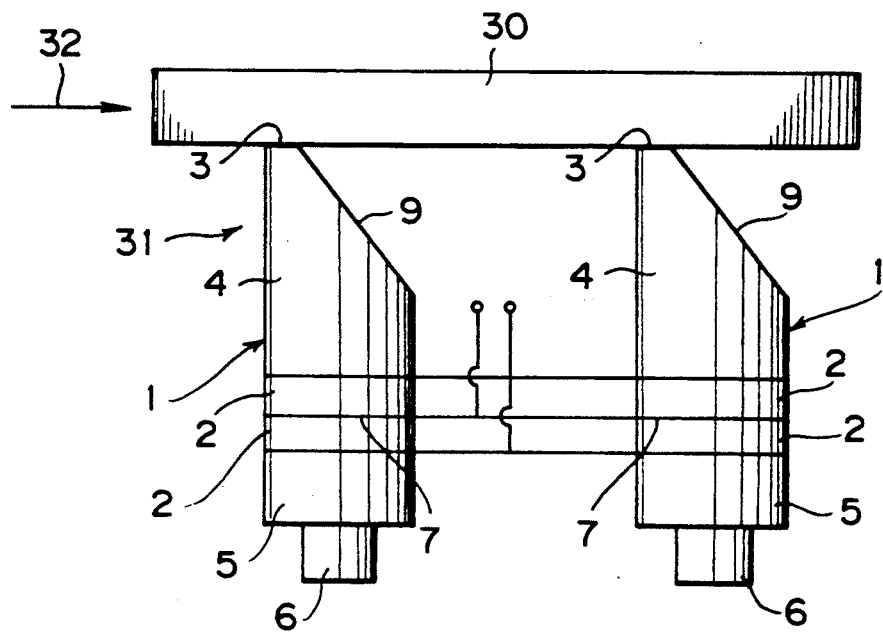

Embodiments of this invention will now be described with reference to the attached drawings.

FIGS. 1a and 1b are a front view and a perspective view, respectively, of a first embodiment of an ultrasonic oscillator 1 in accordance with this invention.

As shown in the drawings, the ultrasonic oscillator 1 comprises piezoelectric elements 2 connected to a high-frequency generator (not shown), a horn (resonator) 4 having a contact surface (a surface which is in contact with an operated body) 3 which is parallel to the oscillating surfaces of the piezoelectric elements 2, a bolt 6 for clamping the horn 4 and the piezoelectric elements 2 through a collar 5 so as to fix them together, etc. The reference numerals 7 indicate terminal plates.

Formed on the horn 4 is an inclined surface 9 extending between the contact surface 3 and the outer peripheral surface, the inclined surface 9 exhibiting a predetermined inclination angle with respect to the axis 8 of the ultrasonic oscillator 1.

When a longitudinal oscillation (in the vertical direction as seen in the drawing) is generated in the ultrasonic oscillator 1 having the above construction upon applying an appropriate high frequency to the piezoelectric elements 2 by means of the high-frequency generator, this oscillation is amplified by the horn 4, the contact surface 3 of the horn 4 oscillating to a large degree in the vertical (longitudinal) direction 10 due to resonance. At the same time, oscillatory waves impinge upon the inclined surface 9 of the horn 4, so that the front-end section of the horn 4 starts oscillating in the lateral direction 11. An elliptical-mode oscillation is then generated out of the longitudinal and lateral oscillations 10 and 11.

Accordingly, when pressed against the contact surface 3, a rotary body such as a rotor (not shown) can be rotated, or a flat plate (not shown) caused to make a parallel movement.

Thus, this embodiment allows an ultrasonic oscillator 1 of a very simple construction and generating an elliptical mode oscillation to be realized at low cost. Furthermore, while in the prior art the section generating the longitudinal oscillation has been provided separately from that which generates the lateral one, inevitably resulting in an oscillation loss in the step section between the two sections, this embodiment involves no such oscillation loss since the elliptical-mode oscillation generating mechanism is formed as an integral whole, thus making it possible to obtain an ultrasonic oscillator 1 which operates at very high efficiency.

FIG. 2 shows a second embodiment of this invention. This embodiment constitutes an example of the structure of an ultrasonic motor 20 using an ultrasonic oscillator 1 in accordance with the first embodiment.

The ultrasonic motor 20 comprises an ultrasonic oscillator 1 and a rotor section 21 which is pressed against the contact surface 3 of the ultrasonic oscillator 1 with a predetermined pressurizing force.

Description of the ultrasonic oscillator 1 will be omitted here since it is identical with that of the first embodiment.

The rotor section 21 is composed of an annular rotor 22 and an axle 24 supporting the rotor 22 through a bearing 23, the rotor 22 being pressed against the contact surface 3 of the horn 4 with a predetermined pressurizing force.

Next, the operation of the ultrasonic motor having the above-described construction will be described.

When a longitudinal oscillation is generated by applying an appropriate high frequency to the piezoelectric elements 2 by means of a high-frequency generator (not shown), an elliptical-mode oscillation is generated in the contact surface 3 as described above. Accordingly, the rotor 22 which is pressed against the contact surface 3 rotates in the direction of elliptical rotation 25, thereby rotating the ultrasonic motor 20.

Thus, this embodiment allows an ultrasonic motor 20 with a very simple construction to be realized, thereby making it possible to produce an ultrasonic motor 20 at low cost. Furthermore, the embodiment involves no oscillation loss since the elliptical-mode oscillation generating mechanism of the ultrasonic oscillator 1 is constructed as an integral whole as described with respect to the first embodiment, so that this embodiment provides a very efficient ultrasonic motor 20.

FIG. 3 shows a third embodiment of this invention. While the ultrasonic motor 20 of the second embodiment rotates the rotor 22, an ultrasonic motor 31 (linear-movement driving device) in accordance with this embodiment is designed to move in a straight line ahead a work 30 constituting the object to be moved. In accordance with this embodiment, two (though the number is not restricted to two) ultrasonic oscillators 1 as described with respect to the first embodiment are arranged side by side, generating a synchronized elliptical-mode oscillation at the contact surfaces 3 of the ultrasonic oscillators 1. Explanation of the construction and operation of each ultrasonic oscillators 1 will be omitted here since these aspects are identical to those of the first embodiment.

With the linear-drive-type ultrasonic motor 31 of this embodiment, a synchronized elliptical-mode oscillation can be generated at each of the contact surfaces 3 by applying a high frequency to each ultrasonic oscillator 1. Accordingly, the work 30 which is movably supported by the contact surfaces 3 can be moved straight ahead in the direction indicated by the arrow 32 by driving the linear-drive-type ultrasonic motor 31.

Thus, this embodiment allows a linear-movement mechanism with a very simple construction to be realized.

Figure 4:
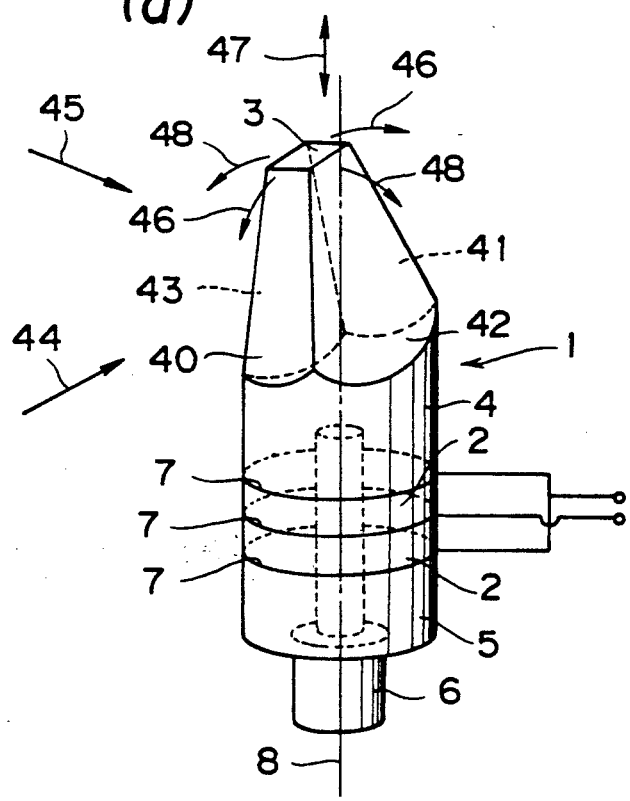
Figure 4:
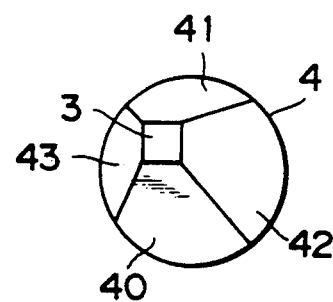

FIGS. 4a and 4b show a fourth embodiment of this invention. In this embodiment, an ultrasonic oscillator 1 is designed to be able to move an object to be moved in two different directions solely by changing the frequency applied. As shown in FIG. 4b, which is a plan view of FIG. 4a, the contact surface 3 of the horn 4 is displaced from the axis 8 of the ultrasonic oscillator 1. Formed in the front end section of the horn 4 are four inclined surfaces 40, 41, 42 and 43. The respective configurations of these inclined surfaces are as follows: the inclined surfaces 42 and 43 are so designed that, as seen on the front side (in the direction indicated by the arrow 44) of the horn 4, the front end section of the horn 4 exhibits an asymmetrical trapezoid-like configuration. At the same time, as seen in the direction of the arrow 45 which is displaced 90° with respect to the arrow 44, the front end section of the horn 4 exhibits an asymmetrical trapezoid-like configuration which is different from what it exhibits when seen in the direction of the arrow 44. Otherwise, this embodiment has the same construction as that of the first embodiment, so explanation thereof will be omitted, similar components being referred to by the same reference numerals.

The operation of the ultrasonic motor having the above construction will now be described.

When the piezoelectric elements 2 are made to oscillate at such a frequency as to cause resonance in the direction indicated by the arrow 46, i.e., in the same direction as the arrow 44, by means of a high-frequency generator (not shown), an elliptical-mode oscillation is started in the plane including the arrow 44 and the central axis 8 due to an action which the same as described in the first embodiment. This elliptical-mode oscillation is caused, as described above, by a longitudinal oscillation 47 and a lateral oscillation in the direction of the arrow 46 generated at the inclined surfaces 40 and 41. Accordingly, when pressed against the contact surface 3, an object to be moved (not shown) can be moved in the direction indicated by the arrow 44 or in the direction opposite thereto.

Likewise, by applying a frequency that will cause resonance in the direction of the arrow 48, i.e., in the same direction as the arrow 45, to the piezoelectric elements 2, an elliptical-mode oscillation can be generated in the same manner as described above in the plane including the arrow 45 and the central axis 8. Accordingly, when pressed against the contact surface 3, an object to be moved can be moved in the direction indicated by the arrow 45 or in the direction opposite thereto.

Thus, this embodiment makes it possible to move an object to be moved in two different directions by means of one ultrasonic oscillator 1 solely by changing the frequency applied, a feature which is very useful and efficient.

FIGS. 5a and 5b show a fifth embodiment of this invention. This embodiment constitutes an example of an ultrasonic motor 50 which is characterized by the structure of the horn 4. That is, the horn 4 in this embodiment forms a pair of protrusions 51 symmetrically arranged with respect to the central axis 8, the two protrusions 51 being displaced by 180° with respect to each other and arranged on either side of the central axis 8. The protrusions 51 have respective contact surfaces 3 which are in the same horizontal plane and inclined surfaces 52 extending between the respective contact surfaces 3 and the side peripheral surface of the horn 4. The reference numeral 53 indicates respective vertical-surface sections of the protrusions. Further, each protrusion 51 has an inclined surface 54 which extends to the position where it interferes structurally with the other protrusion 51, preventing the two protrusions 51 from making oscillations that are independent of each other. The bolt 6 of this embodiment consists of a screw section 6a having a relatively large diameter, a shaft section 6b having a relatively small diameter and a threaded section 6c having a relatively small diameter and provided at the front end of the shaft section 6b, the piezoelectric elements 2 and the body of the horn 4 being fixed to each other by means of the screw section 6a of the bolt 6 through the collar 5. The shaft section 6b of the bolt 6 is inserted into an axial hole 55 of the horn 4, a space being provided between the shaft section 6b and the axial hole 55 so that they will not come into contact with each other during the oscillation of the horn 4.

A rotor 56 is supported by the shaft section 6b extending through the axial hole 55 of the horn 4 through the intermediary of a bearing 57, the rotor 56 being pressed against the contact surfaces 3 of the protrusions 51 of the horn 4 by means of a nut 58 screwed onto the threaded section 6c and a spring 59 provided in a biased state between the nut 58 and the bearing 57. The other structural aspects of this embodiment are the same as those of the first embodiment, so description thereof will be omitted here.

Next, the operation of this embodiment having the above-described construction will be described.

When an appropriate high frequency is applied to the piezoelectric elements 2 by means of a high-frequency generator (not shown), the oscillation generated is amplified by the horn 4, becoming a large longitudinal oscillation 60 at the contact surfaces 3. At the same time, longitudinal oscillatory waves impinge on the inclined surfaces 52, thereby causing the protrusions 51 of the horn 4 to make a lateral oscillation 61. Since this oscillation involves a 180° phase deviation between the pair of protrusions 51, two elliptical-mode oscillations whose phases deviate from each other by 180° are generated, the rotor 56 being rotated by these elliptical-mode oscillations.

In this embodiment, the respective inclined surfaces 54 of the protrusions 51 are designed to interfere structurally with each other, so that the oscillations of the two protrusions 51 are not mutually independent. Accordingly, even if the rotor 56 abuts against only one of the contact surfaces 3, the oscillatory energy on the unloaded side can be easily transmitted to the protrusion 51 on the loaded side. As a result, an ultrasonic motor 50 which is little affected by any unbalanced abutment of the rotor 56 or by external forces acting in the radial direction of the rotor 56 can be obtained. In addition, since a space is provided between the shaft section 6b of the bolt 6 and the axial hole 55 of the horn 4, the oscillatory energy suffers no loss at the horn 4, so that an ultrasonic motor 50 which operates efficiently can be obtained.

FIG. 6 is a front view of a sixth embodiment of an ultrasonic motor 1 in accordance with this invention. The drawing is partly in section to facilitate the description. FIG. 7 is an enlarged perspective view of an essential part of FIG. 6, and FIG. 8 is a perspective view of FIG. 6 showing an essential part thereof in exploded form.

As shown in the drawings, the ultrasonic motor 101 of this embodiment comprises piezoelectric elements 102, a resonator (collar) 103 arranged on one side of the piezoelectric elements 102 a connector 105 having a beam 104, a fixing bolt 106, a rotor 107 which is rotatably supported by the upper section of the fixing bolt 106 through a bearing 107, friction-torque transmitting pins 110 provided between the rotor 108 and the end surfaces 109 (elliptical-oscillation generating surfaces) of the beam 104 and fixed to the front-end surfaces 109 of the beam 104, a nut 112 for adjusting the pressure-attachment-force which serves to press the rotor 108 against the upper surfaces of the pins 110 on the surfaces 109 of the beam 104, etc. The reference numeral 113 indicates terminal plates.

The connector 105 is composed of the beam 104 and a disc section 114 which constitutes the base. As shown in FIG. 8, the beam 104 is formed as a horn which is divided into two beam sections extending from the bottom of a recess 115 the center of which lies on the central axis 116. One side 117 of each beam section is formed as a vertical surface, and the other side 118 thereof is formed as a curved surface, the beam sections being symmetrical with respect to the central axis 116. Thus, the beam 104 is formed as a horn, so that oscillations, in particular, longitudinal ones, can be amplified by virtue of the horn effect.

The fixing bolt 106 extends through the disc section 114 and the bottom of the beam, the rotor 108 being rotatably supported by the protruding shaft section of this fixing bolt 106. At the same time, the rotor 108 is pressed with a predetermined pressurizing force against the upper surfaces of the pins 110 by means of the disc spring 111 and the nut 112 which is used to adjust the pressure-attachment force and which is screwed onto a threaded section 119 at the end of the protruding shaft section of the bolt 106.

The respective end surfaces 109 of the beam sections are situated in a plane which is perpendicular to the central axis 116. Fixed to the respective end surfaces 109 of the beam sections are the pins 110 for friction transmission. The pins 110 are made of a steel of HRC40 or more, stainless steel, or a ceramic material. As shown in FIG. 7, each pin 110 is composed of a pin head 21 and a force-fitting shaft 22 having a smaller diameter, the pins 110 being fixed to the respective end surfaces 109 the force-fitting shafts 122 are force-fitted into respective holes 123 provided at respective ends of the beam sections and extending in the direction of the central axis 116. The force-fitting depth for each pin 110 is defined by a step section 124 thereof. The rotor 108 is pressed against the respective upper surfaces of the pins 110 by means of the disc spring 111 and the nut 112, thus allowing torque to be transmitted to the rotor 8 through the upper surfaces 125 of the pins 110.

In the ultrasonic motor 101 having the above-described construction, longitudinal oscillations (in the thickness direction) generated at the piezoelectric elements 102 are transmitted to the connector 105, thereby generating elliptical oscillations at the end surfaces 109 of the connector 105. Since the pins 110 are fixed to the end surfaces 109 by force fitting, the pins 110 also perform an elliptical oscillation together with the end surfaces 109. Since the rotor 108 is pressed against the respective upper surfaces 125 of the pins 110, torque is transmitted through the upper surfaces 125 to the rotor 108 to rotate the rotor 108.

Thus, in this embodiment, elliptical oscillations generated at the end surfaces 109 of the beam sections are transmitted through the pins 110 to the rotor 108, so that abrasion resistance and an acoustic oscillation characteristic can be respectively imparted to the connector 105 and the pins 110. These two properties are not always compatible with each other but have conventionally been required of materials used for ultrasonic motors. Thus, this embodiment which employs materials with better properties makes it possible to produce an ultrasonic motor 101 which exhibits remarkably enhanced abrasion resistance and acoustic oscillation characteristics.

Since they are fixed by force fitting, the pins 110 can be assembled with ease, allowing automatic assembly also. Furthermore, since the amount by which the pins 110 protrude is defined by the step sections 124 thereof, a plurality of pins 110 which are fixed by force fitting can be in uniform contact with the rotor 108, so that it is not necessary to adjust the pin height by subsequent working of the upper surfaces of the pins 110.

Thus, this embodiment makes it possible to produce an inexpensive ultrasonic motor 101 which has a simple structure, which excels in abrasion resistance and acoustic oscillation characteristics and which operates very efficiently with the benefit of a long service life.

FIGS. 9a, 9b, and 10 show a seventh embodiment of this invention. In this embodiment, the force-fitting shaft sections 122 of the pin 110 in the sixth embodiment are formed as threaded shafts 130 which can be screwed into respective threaded holes 131 provided in the end surfaces 109 of the beam sections. The other aspects of construction are the same as in the sixth embodiment, so that explanation thereof will be omitted here, the components identical to those of the sixth embodiment being referred to by the same reference numerals.

With the above-described construction, the pins 110 can be detachably fixed to the respective end surfaces 109 of the pins 110, so that, when worn out, they can be easily replaced by new ones. Accordingly, the ultrasonic motor 101 will enjoy a longer service life. The construction is otherwise identical to the sixth embodiment, so further description thereof will be omitted.

Figure 11:
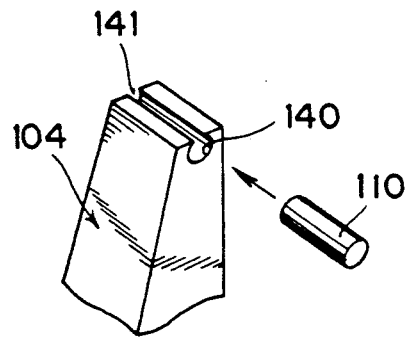
Figure 11:
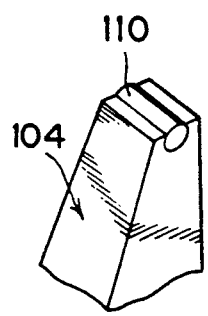
Figure 11:
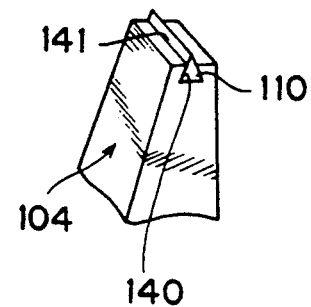
Figure 11:
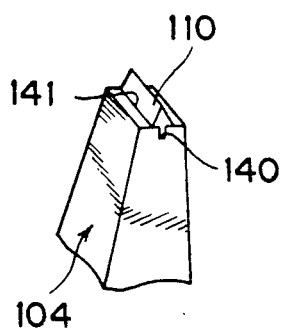
Figure 11:
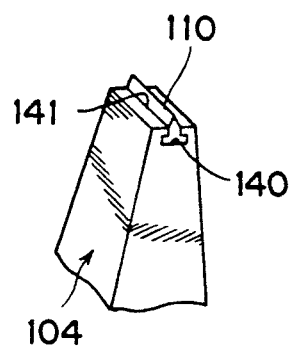

FIGS. 11a, 11b and 11c show an eighth embodiment of this invention. In this embodiment, the pins 110 of the sixth embodiment are formed as cylindrical pins 110, as shown in FIG. 11b, the pins being fixed to the respective end surfaces by being force-fitted into holes 140 which extend in parallel to the end surfaces 109. Each hole 140 is formed in such a manner as to define on the end surface 109 an elongated opening 141 having a certain width and extending in the axial direction of the hole 140, part of the pin 110 protruding through the opening 141 beyond the end surface 9 when fitted into the hole 140.

The construction is otherwise identical to that of the sixth embodiment, so further description thereof will be omitted.

In the construction described above, the pins 110 are in linear contact with the rotor 108, the elliptical oscillation from the connector 105 being transmitted to the rotor 108 through the linear-contact sections. In this case, the elliptical oscillation is transmitted along an orbit, the direction of speed approaching the direction of rotation. In addition, since the contact area is small, noise generation during the torque transmission can be mitigated. Moreover, the pins 110 can be mounted very easily.

Otherwise, the operation and effects of this construction are the same as in the sixth embodiment, so that further description thereof will be omitted.

The configuration of the pin 110 is not limited to a cylindrical one; for example, it may have a triangular, arrow-like or spur-like configuration, as respectively shown in FIGS. 11d, 11e, and 11f.

The pin configurations mentioned above provide the same effects. In particular, the configuration shown in FIG. 11f is advantageous in that each pin 110 can be firmly connected to the corresponding beam section.

Figure 12:
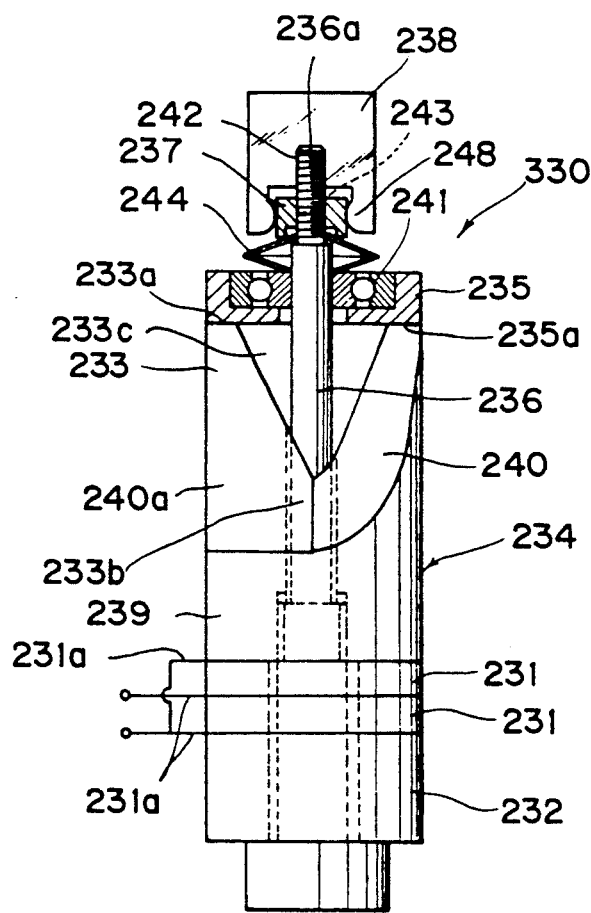
Figure 12:
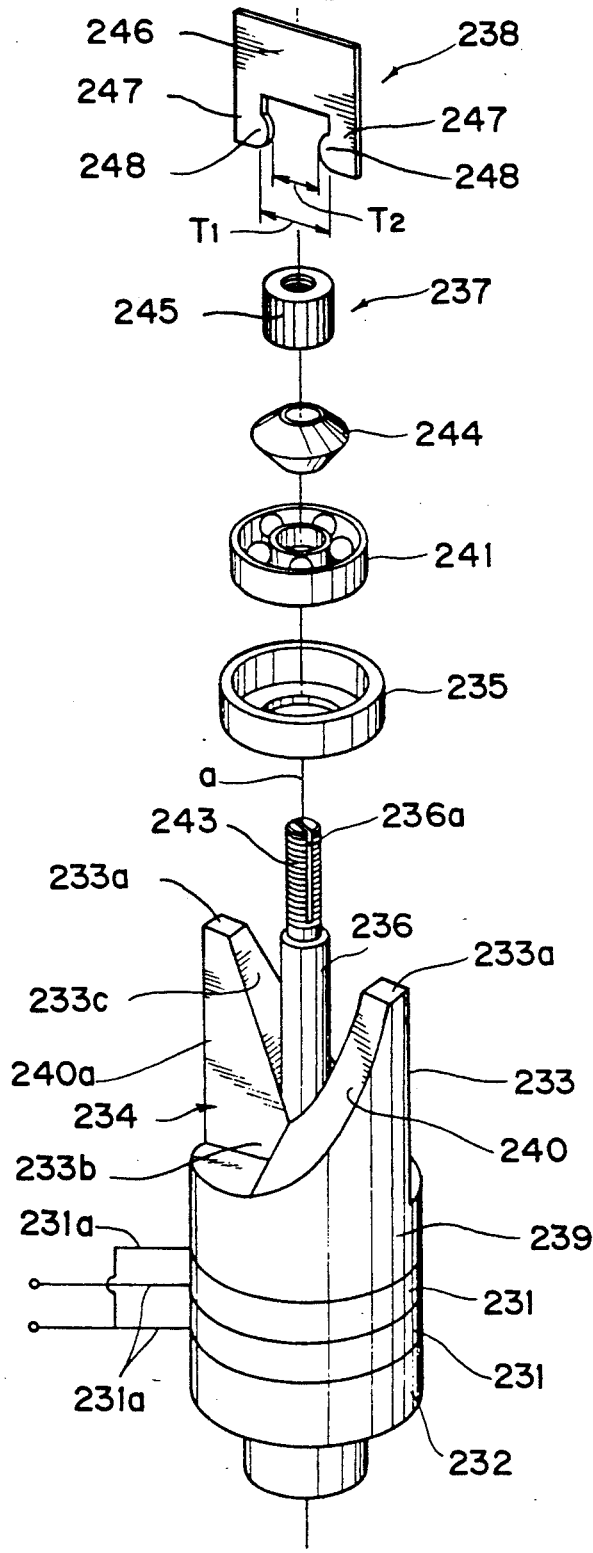

FIG. 12a is a front view, partly in section, of a ninth embodiment of an ultrasonic motor 330 in accordance with this invention, and FIG. 12b an exploded perspective view of the same.

As shown in the drawings, the ultrasonic motor 330 comprises piezoelectric elements 231 having terminal plates 231a, a collar 32 arranged on one side of the piezoelectric elements 231, a connector 234 arranged on the other side of the piezoelectric elements 231 and having a beam 233, a rotor 235 abutting against and retained by elliptical-oscillation generating surfaces 233a of the beam 233, a through-bolt 236 having an end section which extends beyond the rotor 235, a pressure-attachment-force adjusting nut 237 screwed onto the end section of the through-bolt 236, and a lock plate 238 adapted to prevent rotation of the pressure-attachment-force adjusting nut 237.

The connector 234 is composed of the beam 233 and a disc section 239 which constitutes the base. The portion of the disc section 239 around the central axis a and the side surfaces 240 which are directed in the direction opposite to rotation are symmetrical with respect to the central axis a, the connector 234 being formed as a horn including a lower beam portion 233b. Formed at the center of the beam 233 is a U-shaped recess 233c extending downwards from the elliptical-oscillation generating surfaces 233a, leaving a lower beam portion 233b having an appropriate height between the bottom of this recess 233c and the upper surface of the disc 239. Due to the presence of the U-shaped recess 233c, the beam 233 is divided into two longitudinal beam sections extending from the central axis a. One side of each beam section, i.e., the surface 240a opposite the above-mentioned side surface 240, is formed as a vertical surface, whereas the other side thereof, i.e, the side surface 240, is formed as a curved surface, both beam sections being symmetrical with respect to the central axis a.

The bottom surface of the rotor 235 is formed as a pressing surface 235a which abuts against the elliptical-oscillation generating surfaces 233a. Formed on the upper side of the rotor 235 is a recess 235b into which a bearing 241 is fitted.

The through-bolt 236 extends through the collar 232, the piezoelectric elements 231, the connector 234, the rotor 235 and the bearing 241, its end section 236a protruding beyond the bearing 241. A threaded section 242 is formed in this end section 236a as well as a slot 243 extending in the axial direction.

The pressure-attachment-force adjusting nut 237 is screwed onto the above-mentioned threaded section 242. It keeps the rotor 235 pressed against the elliptical-oscillation generating surfaces 233a with a desired pressurizing force supplied by the disc spring 244, and has, around its entire periphery, grooves 245 constituting a serrated surface and adapted to be engaged with a lock plate 238.

The lock plate 238 is inserted into the slot 243 for the purpose of preventing rotation of the pressure-attachment-force adjusting nut 237, and consists of a body section 246 adapted to be inserted into the slot 243 and two feet 247 extending from the side sections of the body section 246 in parallel to each other. Formed at the respective end sections of the feet 247 are holding sections 248 arranged face to face and adapted to hold the pressure-attachment-force adjusting nut 237 by virtue of their engagement with the grooves 245 formed on the nut 237. That is, the distance $T_1$ between the lower ends of the holding sections 248 is larger than the bottom diameter of the nut 237 (distance between diagonally situated bottoms of the grooves 245), and the distance $T_2$ between the middle sections of the holding sections 248 is somewhat less than the above-mentioned bottom diameter, thereby making it possible to elastically retain the nut 237. To facilitate the retention, each holding section 248 exhibits an inclined or curved surface continuously extending from the lower end to the middle section thereof.

In the ultrasonic motor 330 having the above-described construction, the pressing surface 235a of the rotor is pressed against the elliptical oscillation generating surfaces 233a of the connector 234 with a desired pressurizing force supplied by the disc spring 244 and the bearing 241 while rotating the pressure-attachment-force adjusting nut 237 without the lock plate 238 being inserted into the slot 243. Next, the body section 246 of the lock plate 238 is inserted into the slot 243 from above while guiding the lower ends of the holding sections 248 along diagonal grooves 245 of the nut 237, thus lowering the lock plate 238. The peripheral surface of the nut 237 is then retained between the middle sections of the holding sections 348, thereby preventing the nut 237 from rotating.

Figure 13:
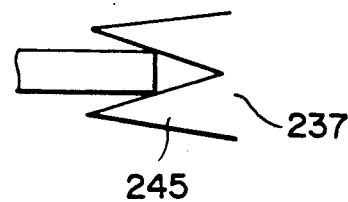
FIGS. 13a, 13b, 13c and 13d are enlarged plan views showing part of pressure-attachment force adjusting nuts.
Figure 13:
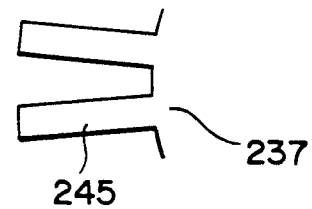
Figure 13:
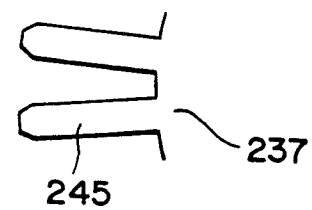
Figure 13:
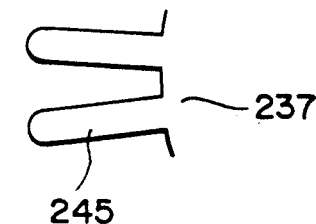

The configuration of the grooves formed around the entire periphery of the pressure-attachment-force adjusting nut 237 may be such that each groove exhibits a rectangular cross-section (FIG. 13b), a rectangular cross-section with linear-chamfered protrusion edges (FIG. 13c), or a rectangular cross-section with rounded protrusion edges (FIG. 13d).

In accordance with this embodiment, the lock plate 238 is prevented from rotating by the slot 243 provided at the end 236a of the through-bolt 236. At the same time, engagement between the holding sections 248 of the lock plate 238 and the grooves 245 provided around the entire periphery of the pressure-attachment-force adjusting nut 237 prevents rotation of the nut 237 which is screwed onto the through-bolt 36 and which serves to adjust the pressurizing force with which the pressing surface 235a of the rotor 235 is pressed against the elliptical oscillation generating surfaces 233a of the connector 234 and to fasten the entire ultrasonic motor 230. Accordingly, the nut 237 can be fixed at an arbitrary position, thereby making it possible to constantly keep the rotor 235 pressed against the connector 234 with a desired pressurizing force.

Furthermore, the nut 237 can be prevented from rotating and secured in position solely by forcing the lock plate 238 into the slot 243 from above, which makes it possible to realize automatic assembly of the ultrasonic motor 230.

Figure 14:
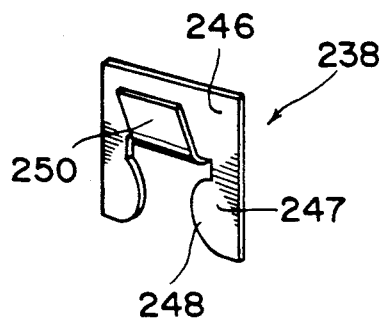
FIG. 14 is a perspective view showing another embodiment of lock member.

As shown in FIG. 14, a stopper 250 can be provided at the lower end of the body section 246 of the lock plate 238. This arrangement allows the lock plate 238 to be firmly fixed to the slot 243 without any looseness even if the thickness of the body section 246 is less than the width of the slot 243, thus preventing the pressure-attachment-force adjusting nut 237 from rotating.

Figure 15:
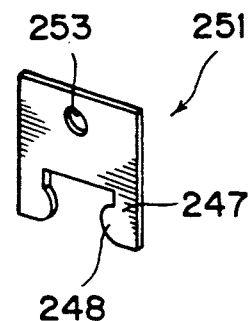
FIG. 15 is a perspective view of an essential part of a tenth embodiment of the ultrasonic motor of this invention.

FIG. 15 shows a tenth embodiment of the ultrasonic motor of this invention. The drawing only shows a lock plate 251 of this embodiment. The other structural aspects of this embodiment are the same as those of the ninth embodiment described above, so further description thereof will be omitted.

The lock plate 251 of this embodiment includes a circular hole 253 provided in the upper section of the body section 252 thereof. The structure is otherwise the same as that of the above-described ninth embodiment, so further description thereof will be omitted, components which are identical to those of the ninth embodiment being referred to by the same reference numerals. The configuration of the above-mentioned hole 253 is not limited to a circular one; it may also be elliptical, rectangular, etc.

This embodiment provides the same effects as the above-described ninth embodiment. At the same time, it is advantageous in that the lock plate 238 can be easily extracted by virtue of the hole if, for example, a hook or the like is used, thereby facilitating readjustment of the pressurizing force with which the rotor is pressed against the elliptical oscillation generating surfaces as well as replacement and readjustment of the rotor when it becomes worn out as a result of the transmission of the ultrasonic-oscillation torque.

Figure 16:
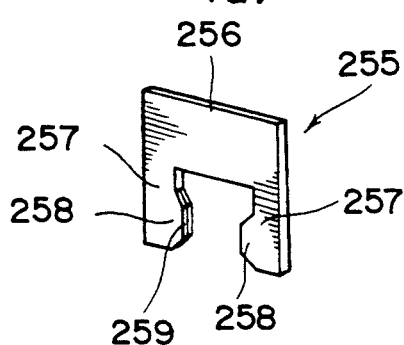
FIGS. 16a and 16b are a perspective view and a plan of an essential part of an eleventh embodiment of the ultrasonic motor of this invention.
Figure 16:
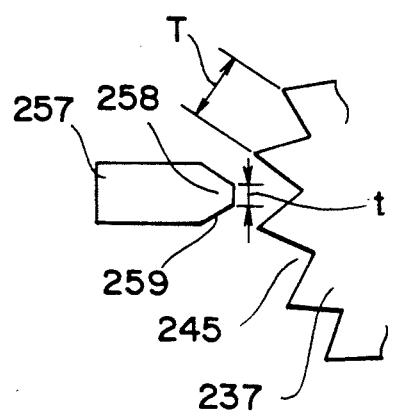

FIGS. 16a and 16b show an eleventh embodiment of the ultrasonic motor of this invention. The drawings simply show a lock plate 255 of this embodiment. The other structural aspects of this embodiment are the same as those of the ninth embodiment described above, so description thereof will be omitted, too.

In the lock plate 255 of this embodiment, the edges of respective holding sections 258 of feet 257 protruding from the body section 256 are formed as tapered-edge sections 259. That is, as shown in an enlarged state in FIG. 16b, the width t of the respective end surfaces of the holding sections 258 is smaller than the pitch T of the grooves 245 provided around the entire periphery of the pressure-attachment-force adjusting nut 237.

This embodiment provides the same effects as the ninth embodiment described above. In addition, it facilitates the engagement between the lock plate 255 and the grooves 245 by virtue of the tapered edge sections 259 of the holding sections, and, at the same time, it allows both the action of preventing rotation of the pressure-attachment-force adjusting nut 237 and adjustment of the pressurizing force with which the rotor is pressed against the connector to be effected more accurately.

Figure 17:
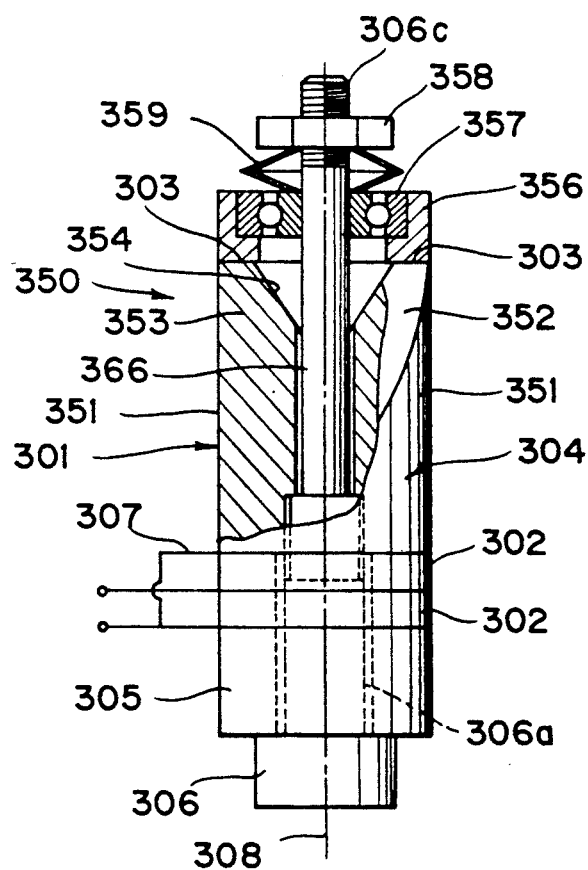
FIG. 17 is a longitudinal sectional view of a twelfth embodiment of the ultrasonic motor of this invention.
Figure 18:
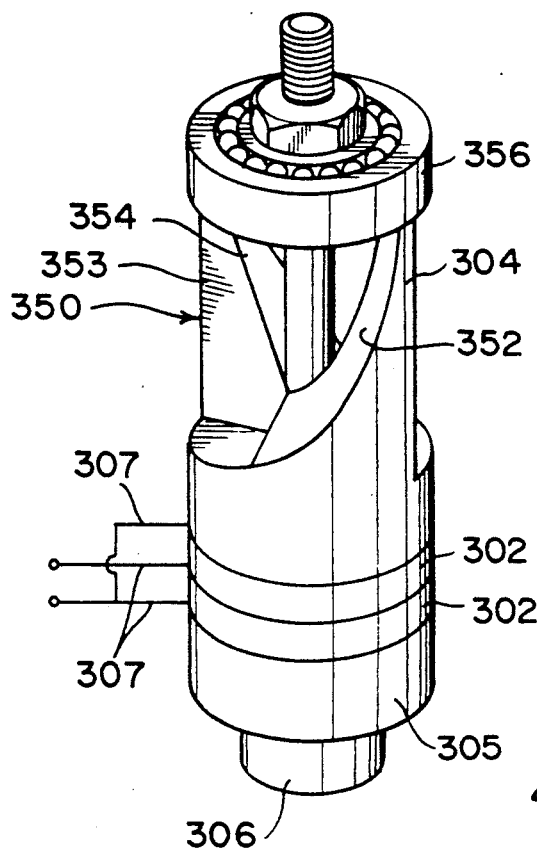
FIG. 18 is a perspective view of the motor of FIG. 17.

FIGS. 17 and 18 show a twelfth embodiment of this invention.

In this embodiment, a bolt 306 extends along the central axis of the ultrasonic motor of this invention through a collar 305, terminal plates 307, piezoelectric elements 302 and is screwed into a horn 304 by virtue of a threaded section thereof, connecting these components to each other with a force sufficient to ensure that the respective contact surfaces are not separated from each other during oscillations in the thickness direction of the piezoelectric elements 302. The axial hole of the horn 304 in accordance with this invention defines a cylindrical space, whose size is so determined as to prevent the bolt 306 from coming into contact with the horn 304 when the latter resonates.

A rotor 356 is supported by a second linear section of the bolt 306 through the intermediary of a bearing 357. A nut 358 which is screwed onto a second threaded section 306c of the bolt 306 serves to adjust the pressurizing force of a spring 359 with which the rotor 358 is kept pressed against the upper surface 303 of the horn 304. The inner diameter of the bearing 357 is determined to allow it to slide in the axial direction along a linear section 366 of the bolt 306 under the pressurizing force of the spring 359. When an appropriate high frequency is applied by means of a high-frequency generator (not shown) to the piezoelectric elements 302, the oscillation is transmitted to the horn 304, becoming a longitudinal oscillation of large degree at the contact surface 303. At the same time, longitudinal oscillatory waves impinge upon inclined surfaces 354, causing protrusions 353 of the horn 304 to oscillate in the lateral direction. This oscillation exhibits a 180° phase deviation between the pair of protrusions 353, thereby generating two elliptical-mode oscillations with a 180° phase deviation which serve to rotate the rotor 356. Since a cylindrical space is provided between the bolt 306 and the horn 304, the horn 304 does not come into contact with the outer periphery of the bolt 306, so that the oscillation of the horn 304 is transmitted to the rotor 356 without being attenuated, thereby improving the performance of the motor. Furthermore, the rotor 356 is rotatably supported by the bolt 306 through the intermediary of the bearing 357, so that the rotor 356 is retained in position in a stable manner with respect to the bolt 306 and the horn 304.

Figure 19:
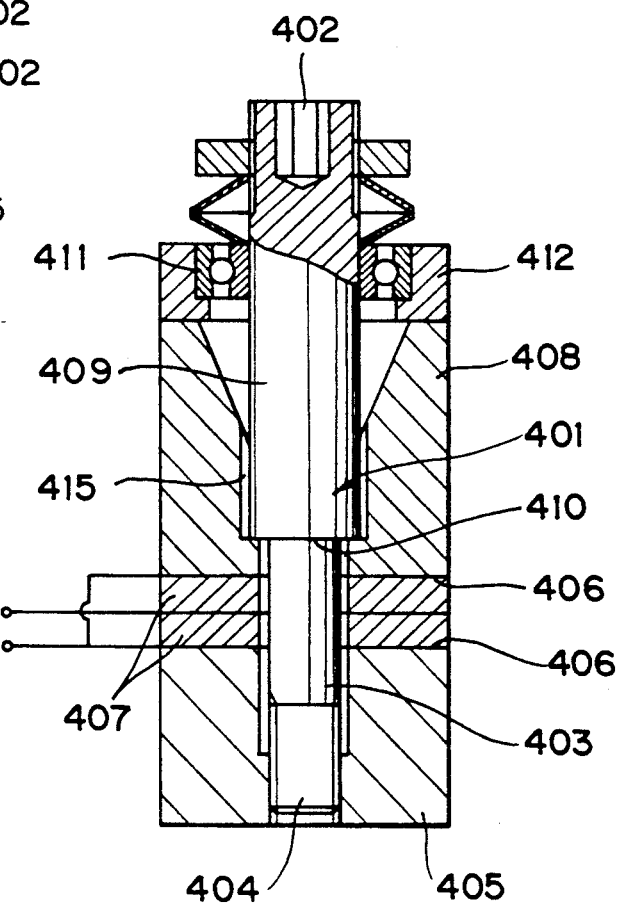
FIG. 19 is a longitudinal sectional view of a thirteenth embodiment of the ultrasonic motor of this invention.

FIG. 19 shows a thirteenth embodiment of this invention.

This embodiment includes a bolt 401 which is formed as a double-stepped bolt equipped with a hexagonal hole 402 at its end. It also includes a collar 405 into which a threaded section 404 of the small diameter section 403 of the bolt 401 is screwed, the collar 405, terminal plates 406, piezoelectric elements 407 and a horn 408 being fixed under pressure with the assistance of a step section 410 provided between the small and large diameter sections 403 and 409 of the bolt 401. Engaged with the outer periphery of the large diameter section 409 of the bolt 401 is the inner periphery of a bearing 411 to the outer periphery of which is fixed a rotor 412. As in the foregoing embodiment, the pressurizing force with which the rotor 412 is pressed against the horn 408 is adjusted by means of a spring 413 and a nut 414. Defined between the inner periphery of the horn 408 and the outer periphery of the bolt 401 is a cylindrical space 415 which serves to prevent the oscillation of the horn 408 from being attenuated.

The thirteenth embodiment provides basically the same effect as the twelfth.

The thirteenth embodiment is advantageous in that all the motor assembly operations can be performed from above, thereby facilitating construction in an assembly line.

What is claimed is:

1. An ultrasonic motor comprising piezoelectric elements and a resonator fixed thereto and having elliptical oscillation generating surfaces, a rotor adapted to be rotated by being pressed against said elliptical oscillation generating surfaces, a through-bolt extending through said ultrasonic motor, a pressure-attachment-force adjusting nut screwed onto the front end section of said through-bolt and adapted to fasten the ultrasonic motor, said nut having grooves around its entire periphery, and a lock member adapted to prevent rotation of said pressure-attachment-force adjusting nut.

2. An ultrasonic oscillator according to claim 1, wherein the surfaces comprise two or more inclined surfaces generating elliptical oscillations in two or more directions by applying to said piezoelectric elements a voltage of a frequency which causes resonances in the directions of the respective inclined surfaces of said resonator.

3. An ultrasonic motor according to claim 1, wherein the nut applies an appropriate pressurizing force against that section of the rotor where said elliptical oscillations are generated.

4. An ultrasonic motor according to claim 1, wherein the section where said elliptical oscillations are generated being adapted to cause a work placed thereon to move straight ahead.

5. An ultrasonic motor according to claim 1, wherein the resonator has a pair of resonator protrusions having the same configuration and arranged in the front end sections of said resonator symmetrically with respect to the axis thereof such as to retain a 180° phase deviation from each other, said resonator protrusions having one or more inclined surfaces, and said rotor being rotated by being pressed against the respective end sections of said resonator protrusions with an appropriate pressurizing force by the nut.

6. An ultrasonic motor according to claim 1, wherein said elliptical oscillation generating surfaces have friction torque transmission pins protruding therefrom and made of stainless steel, iron of HRC40 or more, or a ceramic material.

7. An ultrasonic motor as claimed in claim 6, wherein each of said friction torque transmission pins has a force-fitting section formed as a threaded shaft and adapted to be screwed into a threaded hole provided at the end surface of each beam section of said resonator.

8. An ultrasonic motor as claimed in claim 6, wherein each of said friction torque transmission pins is designed to protrude from each of said elliptical oscillation generating surfaces with a definite protrusion height by virtue of a step section between a head section thereof having a relatively large diameter and a shaft section thereof having a relatively small diameter.

9. An ultrasonic motor as claimed in claim 6, further comprising holes which are in the vicinity of and parallel to said elliptical oscillation generating surfaces, and friction torque transmission pins inserted into said holes in such a manner that their upper sections protrude beyond said elliptical oscillation generating surfaces, said rotor and said pins being in linear contact with each other.

10. An ultrasonic oscillator according to claim 1, wherein the surfaces comprise one or more inclined surfaces generating elliptical oscillations at the front end of said resonator.

11. An ultrasonic motor as claimed in claim 1, wherein said lock member includes holding sections which can be detachably engaged with said grooves of said through-bolt, and is adapted to be inserted into a slot provided at the front end of said through-bolt, thereby preventing rotation of said pressure-attachment-force adjusting nut.

12. An ultrasonic motor according to claim 1, wherein said bolt is in contact only with the base of said resonator and defining a space between itself and the front end section of said resonator so as not to constitute obstruction to the oscillation of the front end section of said resonator.

13. An ultrasonic motor as claimed in claim 12, wherein said bolt is formed as a double-stepped bolt whose large-diameter section is adapted to press a connector against an oscillator and whose small-diameter section supports the inner periphery of a bearing supporting said rotor in such a manner that the bearing can slide in the axial direction.

14. An ultrasonic motor as claimed in claim 12, wherein said bolt is formed as a double-stepped bolt whose small-diameter section includes a step section adapted to press a connector against an oscillator and whose large-diameter section supports the inner periphery of a bearing supporting the rotor in such a manner that the bearing can slide in the axial direction.

15. An ultrasonic motor comprising: piezoelectric elements; and a resonator fixed to the piezoelectric elements and having a front end portion and at least one inclined surface portion continued from the front end portion, the front end portion having a contact surface parallel to an oscillating surface of the piezoelectric elements, the resonator defining a cross section parallel to the contact surface such that the cross-section area at the bottom portion of the resonator is largest, the area of the contact surface is smallest and the cross-section area decreases in a direction from the bottom portion to the contact surface, and that in viewing in a direction from the front end portion to the piezoelectric elements, a projecting surface of the inclined portion is always asymmetrical and is effective to generate elliptical oscillations at the front end portion, and wherein contact with an object to be driven by the ultrasonic motor is made only by the contact surface.

16. An ultrasonic motor comprising: piezoelectric means; resonator means fixed to the piezoelectric means and having surfaces at one end thereof for generating elliptical oscillations; rotor means rotatable when pressed into contact with the elliptical oscillation generating surfaces; and means for pressing the rotor means against the surfaces, comprising a bolt passing through the piezoelectric means, the resonator means and the rotor means and having one threaded end, a pressure adjusting nut engaging the threaded end of the bolt for applying pressure to the rotor means, and locking means engageable with the bolt and the nut for preventing relative rotation of the nut and bolt comprising a slot in the threaded end of the bolt, engaging members projecting from a peripheral surface of the nut and a locking member having a first portion received in the slot and a second portion engaging the engaging members on the nut.

17. The ultrasonic motor according to claim 16, wherein the locking member comprises a flat plate and the first and second portions are integrally formed.

18. The ultrasonic motor according to claim 16, wherein the engaging members have a triangular cross section.

19. The ultrasonic motor according to claim 16, wherein the engaging members have a rectangular cross section.

20. The ultrasonic motor according to claim 16, wherein the engaging members have a rectangular cross section with linear chamfered protrusion edges.

21. The ultrasonic motor according to claim 16, wherein the engaging members have a rectangular cross section with rounded protrusion edges.

22. An ultrasonic motor comprising: piezoelectric elements; a resonator fixed to the piezoelectric elements and having two resonator protrusions symmetrically disposed around a center axis of the resonator, each resonator protrusion having a front end portion having a contact surface parallel to the resonator bottom portion in contact with the piezoelectric elements and having an asymmetrical inclined surface portion continued from the front end portion, each resonator protrusion defining a cross section parallel to the contact surface such that the cross-section area at the bottom portion of the resonator protrusion is largest, the area of the contact surface is smallest and the cross-section area decreases in a direction the bottom portion to the contact surface; and a rotor rotatably supported to rotate about the center axis and pressed in contact with the contact surface of each resonator protrusion by an appropriate pressurizing mechanism; whereby the asymmetrical inclined surface portions of the resonator protrusions are effective to generate elliptical oscillations at each contact surface to rotate the rotor.

23. An ultrasonic motor comprising: piezoelectric elements; and a resonator fixed to the piezoelectric elements and having a front end portion and at least two inclined surface portions continued from the front end portion, the front end portion having a contact surface parallel to an oscillating surface of the piezoelectric elements, the resonator defining a cross section parallel to the contact surface such that the cross-section area at the bottom portion of the resonator is largest, the area of the contact surface is smallest and the cross-section area decreases in a direction from the bottom portion to the contact surface, and that in viewing in a direction from the front end portion to the piezoelectric elements, a projecting surface of each inclined portion is always asymmetrical and is effective to generate elliptical oscillations in at least two directions at the front end portion, and wherein contact with an object to be driven by the ultrasonic motor is made only by the contact surface.

24. An ultrasonic motor comprising: piezoelectric elements; a resonator fixed to the piezoelectric elements and having a front end portion and one or more inclined surfaces continued from the front end portion, the front end portion having a contact surface parallel to an oscillating surface of the piezoelectric elements, the resonator defining a cross section parallel to the contact surface such that the cross-section area at the bottom portion of the resonator is largest, the contact surface is smallest and the cross-section area decreases in a direction from the bottom portion to the contact surface, and that in viewing in a direction from the front end portion to the piezoelectric elements, a projecting surface of each inclined surface is always asymmetrical and is effective to generate elliptical oscillations at the front end portion, ; and a rotatably supported rotor rotated by being pressed with an appropriate pressurizing force against the contact surface of the front end 25. An ultrasonic motor for transmitting a force to a non-vibrated body by friction torque caused by exciting ultrasonic oscillation comprising: piezoelectric elements; a resonator fixed to the piezoelectric elements and having a front end portion having at least one inclined surface portion continued from the front end portion and an elliptical oscillation generating surface parallel to an oscillating surface of the piezoelectric elements, the resonator defining a cross section parallel to the oscillation generating surface such that the cross-section area at the bottom portion of the resonator is largest, the area of the elliptical oscillating generating surface is smallest, and the cross-section area decreases in a direction from the bottom portion to the elliptical oscillation generating surface, and that in viewing in a direction from the front end portion to the piezoelectric elements, a projecting surface of the inclined portion is always asymmetrical, the elliptical oscillation generating surface having attachable and detachable friction torque transmission pins protruding therefrom and made of stainless steal, iron of HRC040 or more, or a ceramic material; and a rotatably supported rotor pressed against and being rotationally driven by the elliptical oscillation generating surface.

26. An ultrasonic motor for transmitting a force to a non-vibrated body by friction torque caused by exciting ultrasonic oscillation according to claim 25, wherein each of said friction torque transmission pins has a force-fitting section formed as a threaded shaft configured to be screwed into a threaded hole on the elliptical oscillation generating surfaces.

27. An ultrasonic motor for transmitting a force to a non-vibrated body by friction torque caused by ultrasonic oscillation according to claim 25, wherein each of said friction torque transmission pins protrudes from each of said elliptical oscillation generating surfaces with a definite protrusion height by virtue of a step section between a head section thereof having a relatively large diameter and a shaft section thereof having a relatively small diameter.

28. An ultrasonic motor for transmitting a force to a non-vibrating body by friction torque caused by ultrasonic oscillation according to claim 25, further comprising means defining holes in the vicinity of and parallel to each elliptical oscillation generating, surface the friction torque transmission pins being inserted into said holes in such a manner that their upper sections protrude beyond said elliptical oscillation generating surfaces, and said rotor and said pins being in linear contact with each other.

* * * * *